US009292356B2

(12) United States Patent
Sambasivan et al.

(10) Patent No.: US 9,292,356 B2
(45) Date of Patent: Mar. 22, 2016

(54) THREAD PROCESSING ON AN ASYMMETRIC MULTI-CORE PROCESSOR

(71) Applicant: Qualcomm Innovation Center, Inc., San Diego, CA (US)

(72) Inventors: Veena Sambasivan, San Diego, CA (US); Narayanan Gopalakrishnan, Mountain View, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 249 days.

(21) Appl. No.: 13/900,292

(22) Filed: May 22, 2013

(65) Prior Publication Data

US 2014/0157284 A1 Jun. 5, 2014

Related U.S. Application Data

(60) Provisional application No. 61/732,917, filed on Dec. 3, 2012.

(51) Int. Cl.
*G06F 9/50* (2006.01)
*G06F 9/48* (2006.01)
*G06F 1/32* (2006.01)

(52) U.S. Cl.
CPC .............. *G06F 9/5088* (2013.01); *G06F 1/324* (2013.01); *G06F 9/4893* (2013.01); *G06F 2209/5022* (2013.01); *Y02B 60/1217* (2013.01); *Y02B 60/144* (2013.01); *Y02B 60/162* (2013.01)

(58) Field of Classification Search
None
See application file for complete search history.

(56) References Cited

U.S. PATENT DOCUMENTS 5,774,704 A * 6/1998 Williams ........................ 713/501
2008/0092142 A1* 4/2008 Tran et al. ..................... 718/105
2013/0103956 A1* 4/2013 Murakami ..................... 713/300

FOREIGN PATENT DOCUMENTS

CN 102004543 A * 4/2011

OTHER PUBLICATIONS

Dewritech, Dynamic frequency scaling, Oct. 3, 2012, Wikipedia, pp. 1-3.*

* cited by examiner

*Primary Examiner* — Emerson Puente
*Assistant Examiner* — Zhi Chen
(74) *Attorney, Agent, or Firm* — Neugeboren O'Dowd PC

(57) ABSTRACT

An ASMP computing device is provided, which comprises one or more computing components, which themselves comprise a plurality of processing units and one or more memory devices that are communicatively coupled to the one or more computing components, Stored on the memory devices are first and second processing frequency data. The first processing frequency data comprise a synchronization frequency, which comprises a frequency for application to all online processing units when a measured highest load of any online processing unit is greater than a first ramp-up processor load threshold and an operating frequency of the online processing unit is lower than the synchronization frequency. The second processing frequency data comprises a ramp-up frequency, the ramp-up frequency comprising a frequency for application to any online processing unit when a measured processing load of any online processing unit is greater than a second ramp-up processing load threshold.

12 Claims, 3 Drawing Sheets

THREAD PROCESSING ON AN ASYMMETRIC MULTI-CORE PROCESSOR

PRIORITY

This application claims priority to U.S. Provisional Application No. 61/732,917, filed Dec. 3, 2012, and entitled Thread Processing on a Multi-Core Processor, which is incorporated herein by reference.

BACKGROUND OF THE INVENTION

1. Field of the Invention

The present invention relates to computing devices. In particular, but not by way of limitation, the present invention relates to frequency scaling in asymmetric multicore processors and multicore chipsets.

2. Relvant Background

In asymmetric multiprocessing (ASMP) of multicore chipsets, each processing core in the chipset can independently scale the processing frequency within the core. On ASMP computing devices, the frequencies of the online processing units can scale asynchronously. Therefore, a first processing core may process a computing thread at a maximum turbo frequency of 1.5 GHz while a second processing core may process a computing thread at a frequency of, for example, 384 MHz. When a computing thread is being processed (i.e., running) on the first processing core at the maximum turbo frequency, the computing thread may be migrated to a second processing core. When this happens and the second processing core frequency is lower than the first processing core frequency, the second processing core may process the computing thread slower than the first processing core. Such cases may lead to stretched timelines and lower throughput with the multicore chipset than with a single processing core, and such stretched timelines and lower throughput may cause visual stutters and/or missed vertical synchronizations or "vsyncs." As a result, multicore chipset performance may be worse than a single processing core performance. Such decreased performance may occur during email scroll, or WLAN processing, for example.

Another problem with current ASMP chipsets occurs with ramping up the load to a maximum (turbo) frequency. With a single core, the load may ramp to the turbo frequency when the load on the core crosses a threshold of 90% of the maximum frequency. Since in a multi-core scenario the load is distributed across different cores, the load threshold(s) for ramping up frequency need to be different from those of single core in order to maximize efficiency and minimize power consumption.

SUMMARY OF THE INVENTION

In order to increase the performance of multicore chipsets and multicore processors, embodiments of the invention modify the distribution of thread processing on one or more computing components comprising a plurality of processing units. For example, if 90% of the maximum frequency is the load threshold on single core, embodiments of the invention herein reduce the threshold to 60 or 70 percent of the maximum frequency when a multi-core processor and/or multi-core chipset is employed. Also, to minimize power consumed by the processing cores, the ramp up frequency for the reduced load threshold may comprise an intermediate frequency rather than a max turbo frequency.

One embodiment of the invention comprises a computing device. One such computing device comprises one or more computing components comprising a plurality of processing units and one or more memory devices communicatively coupled to the one or more computing components. Stored on the one or more memory devices is first processing frequency data and second processing frequency data. The first processing frequency data comprises a synchronization frequency, the synchronization frequency comprising a frequency for application to all online processing units when a measured highest load of any online processing unit is greater than a first ramp-up processor load threshold and the operating frequency of the online processing unit is lower than the synchronization frequency. The second processing frequency data comprises a ramp-up frequency, the ramp-up frequency comprising an intermediate frequency lower than max turbo, for application to any online processing unit when a measured processing load of the any online processing unit is greater than a second ramp-up processing load threshold.

Another embodiment of the invention comprises a method of using a one or more computing components. One such method comprises determining whether a plurality of processing units are online and implementing a single processing unit algorithm when a plurality of processing units are not online. When a plurality of processing units are online, a first ramp-up processor load threshold and a second ramp-up processor load threshold are introduced. Furthermore, a synchronization frequency and a ramp-up frequency are introduced. A load on each of the online processing units is measured and a highest load from the load on each of the online processing units is determined The highest load is then compared to the first ramp-up processor load threshold and the synchronization frequency is applied to each online processing unit when the highest load is greater than the first ramp-up processor load threshold and the operating frequency of the online processing unit is below the synchronization frequency. The load on each of the online processing units is compared to the second ramp-up processing load threshold and the ramp-up frequency, an intermediate frequency lower than max turbo is applied to any online processing unit when a measured load on the any online processing unit is greater than a second ramp-up processing load threshold.

Yet another embodiment of the invention comprises a computing system. One such computing system comprises a means for determining whether a plurality of processing units are online and a means for implementing a single-core processing algorithm when a plurality of processing units are not online. When a plurality of processing units are online, the system comprises a means for introducing a first ramp-up processor load threshold and a second ramp-up processor load threshold. The system further comprises a means for introducing a synchronization frequency and a ramp-up frequency, a means for measuring a load on each of the online processing units, and a means for determining a highest load from the measured load on each of the online processing units. Additionally, the system comprises a means for comparing the highest load to the first ramp-up processor load threshold and a means for applying the synchronization frequency to each online processing unit when the highest load is greater than the first ramp-up processor load threshold and the operating frequency of the online processing unit is below the synchronization frequency. Also included in the system is a means for comparing the load on each of the online processing units to the second ramp-up processing load threshold. The system further includes a means for applying the ramp-up frequency, an intermediate frequency other than max turbo, to any online processing unit when a measured load on the any online processing unit is greater than a second ramp-up processing load threshold.

And yet another embodiment of the invention comprises a non-transitory, tangible computer readable storage medium, encoded with processor readable instructions to perform a method of using a multicore processor. One such method comprises determining whether a plurality of processing units are online and implementing a single-core processing algorithm when multiple processing units are not online. When multiple processing units are online, a first ramp-up processor load threshold and a second ramp-up processor load threshold are introduced. Furthermore, a synchronization frequency and a ramp-up frequency are introduced. A load on each of the online processing units is measured and a highest load from the load on each of the online processing units is determined The highest load is then compared to the first ramp-up processor load threshold and the synchronization frequency is applied to each online processing unit when the highest load is greater than the first ramp-up processor load threshold and the operating frequency of the online processing unit is below the synchronization frequency. The load on each of the online processing units is compared to the second ramp-up processing load threshold and the ramp-up frequency, an intermediate frequency lower than max turbo, is applied to any online processing unit when a measured load on the any online processing unit is greater than a second ramp-up processing load threshold.

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

BRIEF DESCRIPTION ON THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
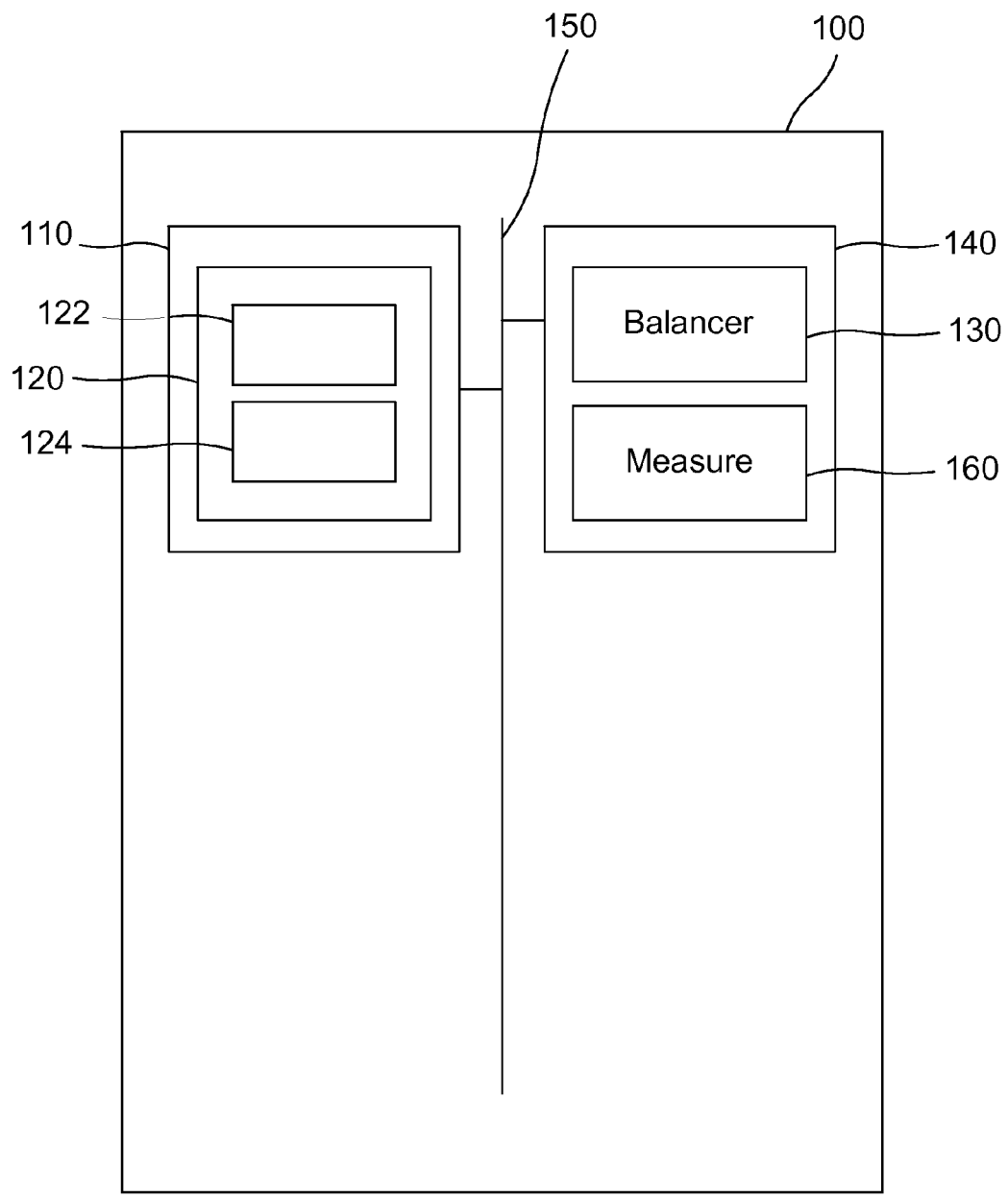
FIG. 1 illustrates a computing device according to one embodiment of the invention.

Turning first to FIG. 1, seen is a computing device 100 comprising processing components 110. Processing components 110 may comprise a multicore chipset 120, among other components. The multicore chipset 120 may be referred to herein as a multicore processor and may also be referred to as one or more computing components. The multicore chipset 120 seen in FIG. 1 comprises at least a first processing core 122 and a second processing core 124. The term "processing core" may also be referred to herein as a "core," a "processing unit" and/or a "processor" or together "multicore processors." Furthermore, additional processing cores are contemplated. In embodiments described below where a single processing core is described, the mobile computing device 100 may only comprise one of the first processing core 122 and the second processing core 124, or the mobile computing device may comprise only one online processing core of the first processing core 122 and the second processing core 124. One computing device 100 may further comprise a load balancer 130. The load balancer 130 may comprise a portion of the processing components 110 or may comprise a portion of another computing device 100 component such as, but not limited to, instructions stored on a memory component. One load balancer efficiently distributes a processing load across the cores 122, 124 in the multicore chipset 120 such that the power consumed by the multicore chipset 120 is less than the power consumed by the multicore chipset without the balancer 130. In one embodiment, the load may be distributed substantially or generally evenly across the cores 122, 124.

Embodiments of the invention described herein provide for reducing a load threshold for frequency ramp up in the multicore chipset 120 to improve the performance of multicore processing. When using multicore processors 122, 124, the load is distributed on the different cores 122, 124, so the load thresholds for ramping up the frequency need to be different from the load threshold of single core. For example, if 90 percent of a maximum load is the load threshold for single core processor, the load threshold may be reduced to 60 or 70 percent of a maximum load for a multi-core processor 120. Also, in order to minimize the power consumed by the processing cores 122, 124, the ramp up frequency for a reduced load threshold comprise an intermediate frequency rather than the maximum turbo frequency.

In one embodiment, the load balancer 130 comprises a portion of, or instructions stored on a portion of one or more memory devices 140 communicatively coupled to the multicore chipset through, for example, a bus 150. One first portion of the memory components 140 may be referred to herein as a load distribution portion. In one such embodiment, the one or more memory devices 150 include a first portion comprising a first processing frequency setting. One first processing frequency setting may be referred to herein as a synchronization frequency, and the synchronization frequency may comprise a processing core processing frequency of about 918 Mhz. However, higher and lower processing frequencies are contemplated. For example, the synchronization frequency may comprise a frequency from about 850 Mhz to about 1.0 Ghz. One synchronization frequency may be applied to each of the processors 122, 124. For example, the synchronization frequency may be applied to each of the multiple processing cores 122, 124 after measuring the processing load on the cores 122, 124 if the operating frequency of cores 122,124 is lower than the synchronization frequency. The processing load of the cores 122, 124 may be measured through a processing load measuring device 160 seen in FIG. 1, which may also comprise instructions within/on a portion of the one or more memory devices 140 or processing components 110. The processing load may be repeatedly measured in one embodiment at a predetermined and/or specified period of time. For example, the processing load may be measured at a user-defined period of every 50 ms. Greater or lesser times are contemplated. In one embodiment, the rate at which the processing load is measured by the measuring device 160 may comprise from about 0.20 ms to 100 ms. Upon measuring the load, the measuring device 160 may be adapted to obtain a highest load among the multiple processing cores 122, 124.

Upon measuring the processing load of the cores 122, 124, the balancer 130 may determine whether the processing load of at least one of the multiple processing cores 122, 124 is greater than a first ramp-up processor load threshold. One first ramp-up processor load threshold may comprise a threshold from about 80% to about 90% of the maximum processing load of the processing core 122, 124. One such first ramp-up processor frequency may comprise a processing frequency from about 900 Mhz to about 1.05 Ghz. Therefore, if it is determined that one of the processing cores 122, 124 is operating at or above 80-90% of the maximum processing load for that core, or any predetermined processing load threshold, which may be preset by a user or automatically set by the balancer (dependent upon the algorithm being run or the device, etc.), the operating frequencies on all the other cores may be kept at a minimum processing frequency of, in one embodiment, about 918 Mhz or greater. Such a minimum processing frequency may comprise the synchronization frequency. Upon completion of processing of the script, the synchronization frequency setting may be removed until the first ramp-up processor load threshold is reached again in future script processing.

The balancer 130 may further comprise a second processing frequency setting comprising a ramp-up frequency. One second ramp-up processing load threshold may comprise a load of about 60-70% of the maximum processing load for the processors. For example, the second ramp-up processing frequency may comprise a frequency from about 850 Mhz to about 918 MHz. If the second ramp-up processing load threshold is met on any processor 122, 124, the balancer 130 may ensure that the processing frequency of that processor 122, 124 is ramped up to the second processing frequency setting.

In one embodiment, the second portion, first portion, or a third portion of the one or more memory devices 140 may have a multiple processing core setting. One multiple processing core setting may implement a single core processing function when the multiple processing core setting determines that multiple processing cores in a multicore chipset are not online or that a single core processor is implemented in the device 100. The single core processing function may also implement the first processing frequency setting and the second processing frequency setting on the first portion and/or the second portion of the memory device 140 when the multiple core setting determines that multiple processing cores 122, 124 in a multicore chipset 120 are online.

The one or more memory devices 140 or processing components 110 may further comprise processing instructions. Such processing instructions may comprise part of the first, second, and/or third portion of the memory devices 140 or may comprise a fourth portion of the memory devices 140. Such processing instructions may be adapted to access the first portion when another portion of the one or more memory devices determines that multiple cores 122, 124 in a multicore chipset 120 are online For example, when the balancer 130 determines that there are multiple cores 122, 124, the first and second processor/processing load threshold(s) may be implemented as described above. In one embodiment, the processing instructions may comprise a script adapted to be processed by the cores 122, 124. Such a script may be processed using a single-core processing algorithm when the balancer 130 determines that multiple cores 124, 122 in a multicore chipset 110 are not online or a single core processor is implemented.

Figure 2:
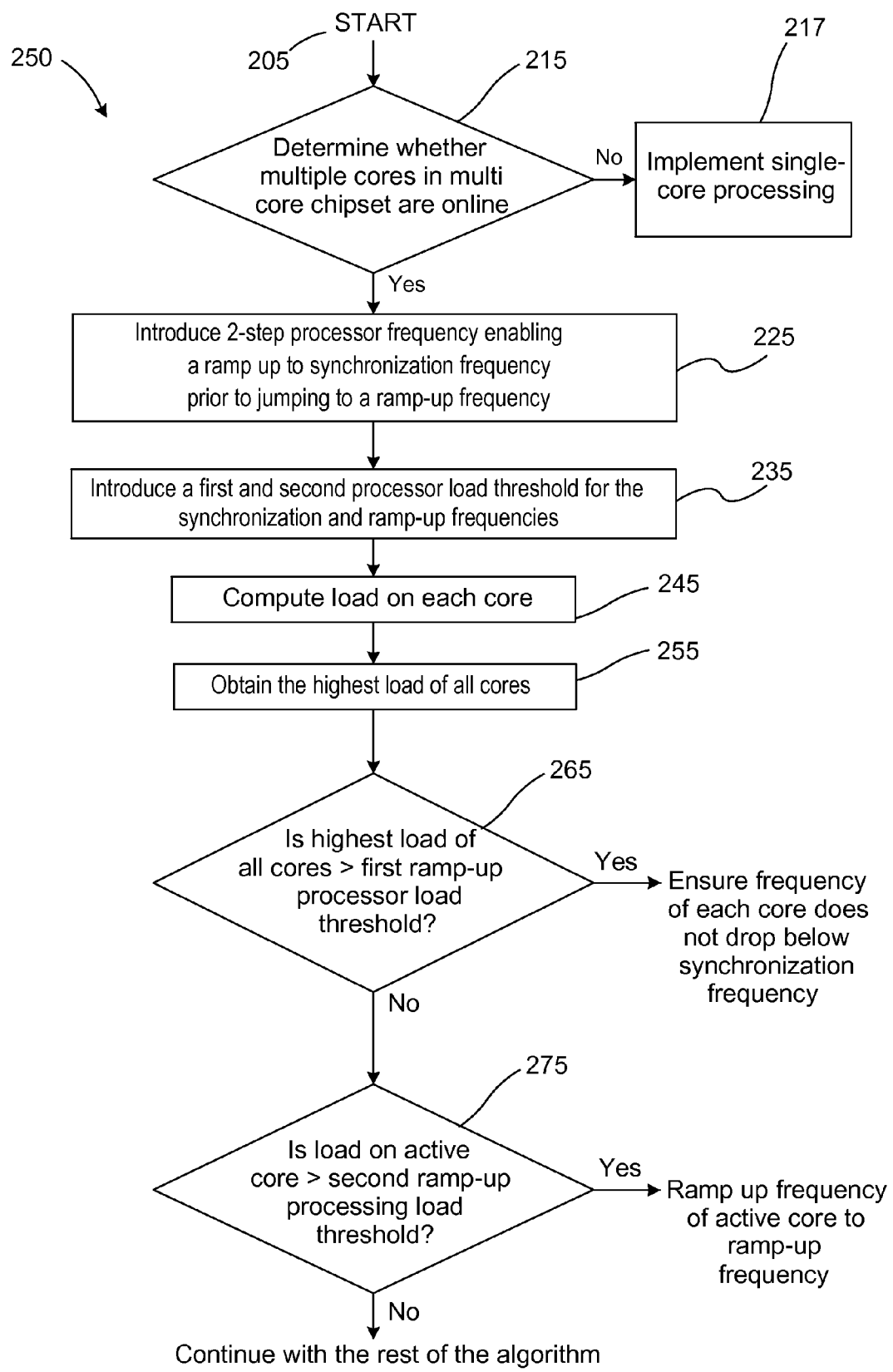
FIG. 2 illustrates a flowchart that depicts a method that may be carried out in connection with the embodiments described herein.

Turning now to FIG. 2, seen a method 250 that may be performed by embodiments of the invention described herein. One such method 250 starts at 205 and may include running a processing algorithm. For example, the computing device 100 seen in FIG. 1 may receive a script to process with the processing algorithm stored on the processing components 110 and/or the memory devices 140. At 215, the method 205 comprises determining whether multiple processing cores 122, 124 in a multicore chipset 220 are online If not, then, as seen at 217, a single-core processing algorithm may be initiated or continued.

If the processing algorithm determines that multiple processing cores in a multi-core chipset are online, then, and as seen at 225, a two-step processor frequency may be introduced to the cores 122, 124. As described herein, the two-step processor frequency comprises a synchronization frequency and a ramp-up frequency. One synchronization frequency comprises an intermediate processor frequency for application to all cores 122, 124 when a first ramp-up processor load threshold is reached on any of the cores 122, 124 and when the operating frequency of cores 122, 124 is lower than the synchronization frequency. For example, if one of the cores reaches the first ramp-up processor load threshold, which may comprise about 80%-90% of the maximum processing load then each of the cores 122, 124 may not fall below an intermediate processor frequency of about 918 Mhz until the script processing is complete. In one such embodiment, instead of one processor in a multicore processor ramping-up to a maximum turbo processor frequency, each processor may operate at the intermediate processor frequency. In such an embodiment where the processors operate at the intermediate processor frequency, the device 100 may consume less power than, and process the script more quickly than, or at least nearly as quick as, when one of the cores 122, 124 is operating at a maximum turbo processor frequency and the other cores operate at a less than intermediate frequency. The second ramp-up processing frequency may comprise ramping up a frequency on any core 122, 124 to a ramp-up frequency when the second ramp-up processing load threshold is reached. In both scenarios, when a processing load subsequently reaches a maximum turbo load threshold, the processing frequency for that core may be ramped up to the maximum turbo processor frequency. In introducing the two-step processor load threshold, one method 250 may determine whether to implement either of the two-step processor load threshold when multiple processing cores 122, 124 in the multicore processor 120 are online.

Moving now to block 235, a first ramp-up processor load threshold and a second ramp-up processing load threshold may be introduced for the synchronization frequency and a ramp-up frequency. The threshold to ramp-up to the ramp-up frequency may comprise about 60-70% of the maximum processor load. The ramp-up to the synchronization frequency may comprise about 80-90% of the maximum processor load. For example, the threshold to signal to the processors to ramp to the synchronization frequency may comprise a threshold processing load of about 80-90% of the maximum processing load. However, other processing load thresholds are contemplated. Similarly, the threshold to signal to the processors to ramp up to the ramp-up frequency may comprise a second ramp-up processing load threshold of about 60-70% of the maximum processing load. It is contemplated that one maximum processing frequency may comprise about 1.5 GHz.

After introducing the threshold frequencies described above at step 235, and as seen at step 245, an active load may be determined/computed for each online multiple processing core. Furthermore, and as seen at step 255, each of these core processing loads may be compared and the highest processing load may be determined. At step 265, the highest load of any core within the multicore processor 100 may be compared to the first ramp-up processor load threshold which was introduced at step 235. If the highest load is greater than the first ramp-up processor load threshold, then, when scaling frequencies across the cores, the frequencies of each of the cores will be kept at a minimum intermediate processing frequency, also described as a synchronization frequency, or a non-turbo frequency, until the current script is finished processing. One synchronization frequency may comprise a frequency of about 918 MHz. However, other intermediate processing frequencies are contemplated.

If the highest load on any processing core is not greater than the first ramp-up processor load threshold, step 275 may be invoked. At step 275, the measured load determined for each active core at step 245 may then be compared to the second ramp-up processing load threshold. If the load on the active core is greater than the second ramp-up processing load threshold, then the frequency on the active core may be increased to the ramp-up frequency. If the load on the active core is not greater than the second ramp-up processing load threshold, then the remainder of the processing script algorithm may be executed.

Implementing the step of 265 which compares the highest load of the active processing cores to the first ramp-up processor load threshold addresses the ASMP problem of implementing a second processing core frequency that is slower than the first processing core frequency, which causes slower processing of the computing thread as compared to the computing thread processing on only the first/single processing core by ensuring a minimum processing frequency for each core. Similarly, implementing the step of 275 which (i) compares the load on each active processing core to the second ramp-up processing load threshold, and (ii) then increases the frequency to the ramp-up frequency on each core operating at at least the second ramp-up processing load threshold, addresses a second problem with frequency scaling in multi-core scenarios when load is distributed on to the cores in the ASMP chipset. This second problem is that with current ASMP chipsets, a core only ramps up to a maximum (turbo) frequency when the load crosses a threshold of 90% of the maximum frequency. By implementing the ramp-up frequency, the processing time is decreased across cores on a multicore processor 100 and power is saved as the load is spread across cores at a lower frequency.

In one embodiment, the first processor load threshold for the synchronization frequency comprises a load greater than the second processor load threshold for the ramp-up frequency. Furthermore, the synchronization frequency may comprise a frequency greater than the ramp up frequency for the second processor load threshold.

Figure 3:
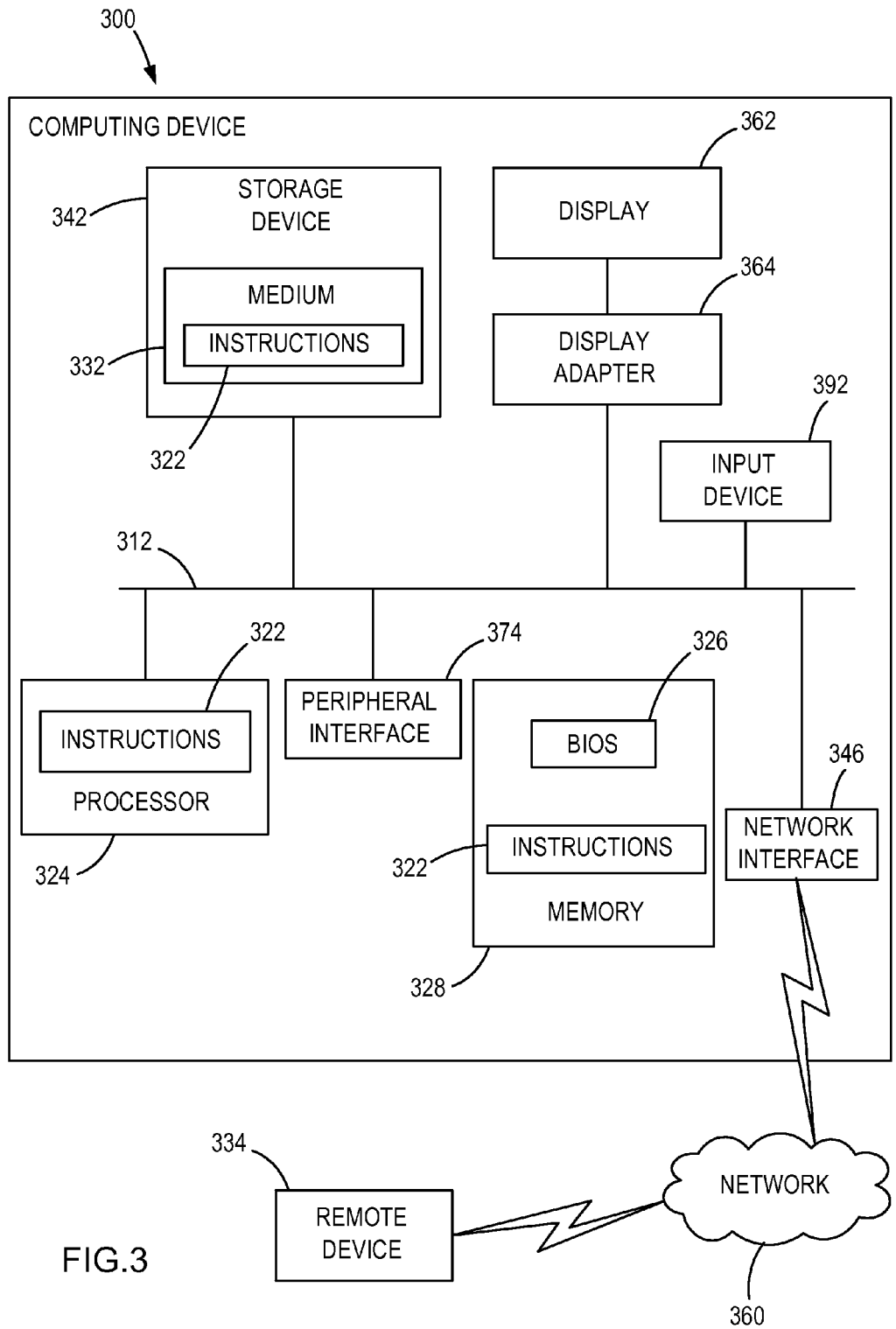
FIG. 3 illustrates components of a computing system according to one embodiment of the invention.

FIG. 3 shows a diagrammatic representation of one embodiment of a machine in the exemplary form of the computing device 300 within which a set of instructions for causing a device to perform any one or more of the aspects and/or methodologies of the present disclosure to be executed. Computing device 300 includes the processor 324, which may be similar to the processing components 110 of FIG. 1 and which communicates with the memory 328 and with other components, via the bus 312 which may be similar to the bus 150 of FIG. 1. Bus 312 may include any of several types of bus structures including, but not limited to, a memory bus, a memory controller, a peripheral bus, a local bus, and any combinations thereof, using any of a variety of bus architectures.

Memory 328 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 326 (BIOS), including basic routines that help to transfer information between elements within computing device 300, such as during start-up, may be stored in memory 328. Memory 328 may also include (e.g., stored on one or more machine-readable media) instructions (e.g., software) 322 which may comprise the balancer 130, measuring device 160, and the portions of the one or more memory components and/or devices described with reference to FIG. 1 and elsewhere. The instructions 322 may embody any one or more of the aspects and/or methodologies of the present disclosure. In another example, memory 328 may further include any number of program modules including, but not limited to, an operating system, one or more application programs, other program modules, program data, and any combinations thereof.

Computing device 300 may also include a storage device 342. Examples of a storage device (e.g., storage device 342) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 342 may be connected to bus 312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 342 may be removably interfaced with computing device 300 (e.g., via an external port connector (not shown)). Particularly, storage device 342 and an associated machine-readable medium 332 may provide nonvolatile and/or volatile storage of machine-readable instructions, data structures, program modules, and/or other data for computing device 300. In one example, instructions 322 may reside, completely or partially, within machine-readable medium 332. In another example, instructions 322 may reside, completely or partially, within processor 324.

Computing device 300 may also include an input device 392. In one example, a user of computing device 300 may enter commands and/or other information into computing device 300 via input device 392. Examples of an input device 392 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 392 may be interfaced to bus 312 via any of a variety of interfaces (not shown) including, but not limited to, a serial interface, a parallel interface, a game port, a USB interface, a FIREWIRE interface, a direct interface to bus 312, and any combinations thereof.

A user may also input commands and/or other information to computing device 300 via storage device 342 (e.g., a removable disk drive, a flash drive, etc.) and/or a network interface device 346 which may comprise the transmitter/receiver. In one embodiment, the transmitter/receiver comprises a wireless transmitter/receiver. A network interface device, such as network interface device 346 may be utilized for connecting computing device 300 to one or more of a variety of networks, such as network 360, and one or more remote devices 334 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 360, may employ a wired and/or a wireless mode of communication. In general, any network topology may be used. Information (e.g., data, software, etc.) may be communicated to and/or from computing device 300 via network interface device 346.

Computing device 300 may further include a video display adapter 364 for communicating a displayable image to a display device, such as display device 362. Examples of a display device include, but are not limited to, a liquid crystal display (LCD), a cathode ray tube (CRT), a plasma display, and any combinations thereof. In addition to a display device, a computing device 300 may include one or more other peripheral output devices including, but not limited to, an audio speaker, a printer, and any combinations thereof. Such peripheral output devices may be connected to bus 312 via a peripheral interface 374. Examples of a peripheral interface include, but are not limited to, a serial port, a USB connection, a FIREWIRE connection, a parallel connection, and any combinations thereof. In one example an audio device may provide audio related to data of computing device 300 (e.g., data representing an indicator related to pollution impact and/or pollution offset attributable to a consumer).

A digitizer (not shown) and an accompanying stylus, if needed, may be included in order to digitally capture freehand input. A pen digitizer may be separately configured or coextensive with a display area of display device 362. Accordingly, a digitizer may be integrated with display device 362, or may exist as a separate device overlaying or otherwise appended to display device 362.

As described herein, one embodiment of the invention may comprise a computing system. A computing system may comprise the device 100, 300 seen in FIGS. 1 and 3. One such system may comprise means for determining whether multiple processing cores in a multicore chipset are online For example, such means may comprise the instructions 322 seen in FIG. 3 and/or operations described with reference to FIGS. 1 and 2. The system may further comprise a means for implementing a single-core processing algorithm when multiple processing cores in the multicore processor are not online Such means may also comprise the instructions 322 seen in FIG. 3 and/or operations described with reference to FIGS. 1 and 2.

A system may also comprise means for implementing a single-core processing algorithm when multiple processing cores in the multicore processor are not online Such means may comprise the instructions 322 seen in FIG. 3 and/or described with reference to FIGS. 1 and 2. The system may also comprise a means for introducing a first ramp-up processor load threshold, a means for introducing a second ramp-up processor load threshold, a means for introducing a synchronization frequency and a ramp-up frequency, and a means for measuring a load on each of the online multiple processing cores. Each of these means may also comprise the instructions 322 seen in FIG. 3 and/or operations described with reference to FIGS. 1 and 2.

As described herein, the system may comprise a means for determining a highest load from the load on each of the online multiple processing cores, means for comparing the highest load to the first ramp-up processor load threshold, means for applying the synchronization frequency to each online multiple processing core when the highest load is greater than the first ramp-up processor load threshold and the operating frequency of the online processing core is lower than the synchronization frequency, means for comparing the load on each of the online multiple processing cores to the second ramp-up processing load threshold and means for applying the ramp-up frequency to any online multiple processing core when a measured load on the any online multiple processing core is greater than a second ramp-up processing load threshold. Each of these means may further comprise the instructions 322 seen in FIG. 3 and/or operations described with reference to FIGS. 1 and 2.

Yet another embodiment of the invention comprises a non-transitory, tangible computer readable storage medium, encoded with processor readable instructions to perform a method of using a multicore processor. Such instructions may comprise the instructions 322 described above and/or the operations described with reference to FIGS. 1 and 2. One such embodiment of a non-transitory, tangible computer readable storage medium, encoded with processor readable instructions to perform a method of using a multicore processor may comprise determining whether multiple processing cores in a multicore chipset are online, implementing a single-core processing algorithm when multiple processing cores in the multicore processor are not online, introducing a first ramp-up processor load threshold, introducing a second ramp-up processor load threshold, introducing a synchronization frequency and a ramp-up frequency, measuring a load on each of the online multiple processing cores, determining a highest load from the load on each of the online multiple processing cores, comparing the highest load to the first ramp-up processor load threshold, applying the synchronization frequency to each online multiple processing core when the highest load is greater than the first ramp-up processor load threshold and operating frequency of the online processing core is lower than the synchronization frequency, comparing the load on each of the online multiple processing cores to the second ramp-up processing load threshold; and applying the ramp-up frequency to any online multiple processing core when the measured load on the online multiple processing core is greater than a second ramp-up processing load threshold.

In conclusion, embodiments of the present invention provide for optimized processing using a multicore chipset. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A computing device comprising,
   one or more computing components comprising a plurality of processing units; and
   one or more memory devices communicatively coupled to the one or more computing components, the one or more memory devices storing;
      first processing frequency data comprising a synchronization frequency, the synchronization frequency comprising a frequency for application to each of the plurality of processing units when at least two of the processing units are online, and
      a measured highest load from the load on each of any online processing unit is greater than a first ramp-up processor load threshold, wherein the first ramp-up processor load threshold is a predetermined percentage of the maximum processing load of one of the processing units, and
      an operating frequency of at least one of the at least two online processing units is lower than the synchronization frequency; and second processing frequency data comprising a ramp-up frequency, the ramp-up frequency comprising a frequency for application to any online processing unit when a measured processing load of the any online processing unit is greater than a second ramp-up processing load threshold but less than the first ramp-up processing load threshold, wherein the second ramp-up processing threshold is a predetermined percentage of the maximum processing load of one of the processing units and is less than the first ramp-up processor load threshold.

2. The computing device of claim 1 wherein,
the first processing frequency data and the second processing frequency data further comprise load distribution data stored on at least one of the one or more memory devices; and
the one or more memory devices further store processing unit data, the processing unit data implementing,
a single core processing function when the processing unit data indicates that a single processing unit of the plurality of processing units is online, and
the load distribution data when the processing unit data indicates that multiple processing units in the plurality of processing units are online.

3. The computing device of claim 2 wherein, the one or more memory devices further comprise first additional data stored on the one or more memory devices able to,
determine the measured load; and
obtain a highest load among the multiple processing cores.

4. The computing device of claim 3 wherein, the one or more memory devices further comprise second additional data stored on the one or more memory devices able to,
process instructions; and
access the load distribution data when the processing unit data indicates that multiple processing units are online.

5. The computing device of claim 4 wherein, the second additional data is further adapted to process the instructions using a single-core processing algorithm without accessing the load distribution data when the processing unit data indicates that processing units are not online.

6. A method of using a one or more computing components comprising,
determining whether a plurality of processing units are online;
implementing a single processing unit algorithm when a plurality of processing units are not online;
introducing a first ramp-up processor load threshold, wherein the first ramp-up processor load threshold is a predetermined percentage of the maximum processing load of one of the processing units;
introducing a second ramp-up processor load threshold, wherein the second ramp-up processing threshold is a predetermined percentage of the maximum processing load of one of the processing units and is less than the first ramp-up processor load threshold;
introducing a synchronization frequency and a ramp-up frequency;
measuring a load on each processing unit when at least two of the plurality of processing units are online;
determining a highest load from the load measured on each of the online processing units;
comparing the highest load to the first ramp-up processor load threshold;
applying the synchronization frequency to each online processing unit when,
the highest load is greater than the first ramp-up processor load threshold, and
an operating frequency of at least one of the at least two online processing units is lower than the synchronization frequency;
comparing the load on each of the online processing units to the second ramp-up processing load threshold; and
applying the ramp-up frequency to any online processing unit when a measured load on the any online processing unit is greater than a second ramp-up processor load threshold but less than the first ramp-up processor load threshold.

7. The method of claim 6 wherein, the synchronization frequency is greater than the ramp-up frequency.

8. A non-transitory, tangible computer readable storage medium, encoded with processor readable instructions to perform a method of using a multicore processor comprising,
determining whether a plurality of processing units are online;
implementing a single processing unit algorithm when a plurality of processing units are not online;
introducing a first ramp-up processor load threshold, wherein the first ramp-up processor load threshold is a predetermined percentage of the maximum processing load of one of the processing units;
introducing a second ramp-up processor load threshold, wherein the second ramp-up processing threshold is a predetermined percentage of the maximum processing load of one of the processing units and is less than the first ramp-up processor load threshold;
introducing a synchronization frequency and a ramp-up frequency;
measuring a load on each processing unit when at least two of the plurality of processing units are online;
determining a highest load from the load measured on each of the online processing units;
comparing the highest load to the first ramp-up processor load threshold;
applying the synchronization frequency to each online processing unit when,
the highest load is greater than the first ramp-up processor load threshold, and
an operating frequency of at least one of the at least two online processing units is lower than the synchronization frequency;
comparing the load on each of the online processing units to the second ramp-up processing load threshold; and
applying the ramp-up frequency to any online processing unit when a measured load on the any online processing unit is greater than a second ramp-up processor load threshold but less than the first ramp-up processor load threshold.

9. The non-transitory, tangible computer readable storage medium of claim 8, wherein the method further comprises, implementing a single-core processing algorithm when a plurality of processing units are not online.

10. The non-transitory, tangible computer readable storage medium of claim 8, wherein power consumed by the plurality of processing units when each of the plurality of processing units is operating at the synchronization frequency is less than or equal to the power consumed when one of the plurality of processing units is operating at a maximum turbo frequency and another one of the plurality of processing units is operating at less than the synchronization frequency.

11. The non-transitory, tangible computer readable storage medium of claim 8, wherein, the ramp-up frequency is lower than the synchronization frequency.

12. The non-transitory, tangible computer readable storage medium of claim 8, wherein, the applying the synchronization frequency to each online processing unit when the highest load is greater than the first ramp-up processor load threshold and the operating frequency of the online processing unit is lower than the synchronization frequency comprises processing an algorithm on each online processing unit.

* * * * *